(12) United States Patent
Wang

(10) Patent No.: US 8,393,836 B2
(45) Date of Patent: Mar. 12, 2013

(54) MACHINE TOOL WITH CAMERA

(75) Inventor: Chun-Kai Wang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 1017 days.

(21) Appl. No.: 12/414,601

(22) Filed: Mar. 30, 2009

(65) Prior Publication Data

US 2009/0263199 A1  Oct. 22, 2009

(30) Foreign Application Priority Data

Apr. 16, 2008  (CN) .......................... 2008 1 0301159

(51) Int. Cl.
    *B23D 7/00* (2006.01)
    *B23F 5/00* (2006.01)
    *B23B 3/36* (2006.01)

(52) U.S. Cl. .............................. 409/235; 409/16; 82/152

(58) Field of Classification Search .................. 409/235, 409/16, 408, 409, 451, 82, 83; 82/152, 118, 82/1.11; 83/365
See application file for complete search history.

(56) References Cited

U.S. PATENT DOCUMENTS

| 5,392,502 A * | 2/1995 | Freer ................................ 29/52 |
| 7,120,288 B2 * | 10/2006 | Fujishima ...................... 382/152 |
| 7,929,050 B2 * | 4/2011 | Liang et al. .................... 348/373 |
| 2002/0054800 A1 * | 5/2002 | Hwu et al. ..................... 409/116 |
| 2004/0129756 A1 | 7/2004 | Zakel et al. |

FOREIGN PATENT DOCUMENTS

| JP | 2274442 A | 11/1990 |
| JP | 2006305691 A | 11/2006 |

* cited by examiner

*Primary Examiner* — Teresa M Ekiert
(74) *Attorney, Agent, or Firm* — Altis Law Group, Inc.

(57) ABSTRACT

An exemplary machine tool includes a main body, a transmission, a spindle, a fixture, a cutter, a driving device, and a camera. The transmission is coupled to the main body. The spindle is coupled to the transmission. The fixture is coupled to the spindle and holds a workpiece. The cutter and the driving device are coupled to the main body. The cutter is opposite to the spindle and configured for processing the workpiece. The camera is coupled to the driving device and is configured for capturing images of the cutter and the workpiece.

18 Claims, 7 Drawing Sheets

MACHINE TOOL WITH CAMERA

BACKGROUND

1. Field of the Invention

Embodiments of the present disclosure relate to machine tools, and more particularly to a machine tool including a camera.

2. Description of Related Art

Machine tools such as a computer numerical control (CNC) machine tool may include a multi-axis holder or a linear (X, Y axis) holder. In either case, a cutting tool moves relative to the blank or workpiece under the control of a programmable controller, which itself includes a computer program. The cutting tool is not restricted to standard turning or milling cutters, but also includes all mechanical, electronic and/or electro-mechanical devices used to modify the shape and/or properties of the workpiece.

With a typical machine tool, the workpiece must first be fixed to the machine tool, and the cutting tool (or cutter) must then be accurately aligned with the workpiece. This may be a slow process and difficult to execute precisely. After machining, the workpiece must be removed from the machine tool and its shape observed. This procedure normally requires iteration. Furthermore, repeated fixing and removal of the workpiece is subject to human error, and is time-consuming.

Therefore, a machine tool is desired to overcome the limitations described.

BRIEF DESCRIPTION OF THE DRAWINGS

Many aspects of embodiments of the present machine tool can be better understood with reference to the following drawings. The components in the drawings are not necessarily drawn to scale, the emphasis instead being placed upon clearly illustrating the principles of the present machine tool. Moreover, in the drawings, like reference numerals designate corresponding parts throughout the several views.

DETAILED DESCRIPTION OF CERTAIN INVENTIVE EMBODIMENTS

Figure 1:
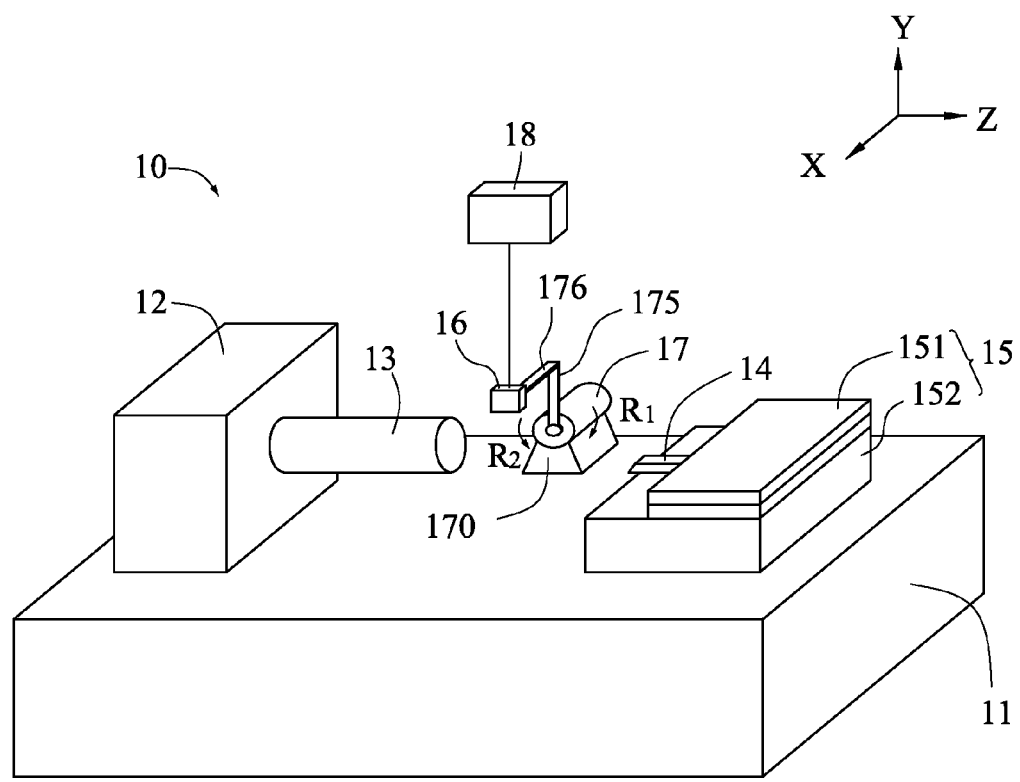
FIG. 1 is a schematic view of a machine tool according to a first embodiment, the machine tool including a driving device and a camera.

Referring to FIG. 1, a machine tool 10 according to a first embodiment is shown. The machine tool 10 includes a main body 11, a transmission 12, a spindle 13, a cutter 14, a cutter block 15, a camera 16, and a driving device 17.

The main body 11 is configured for mounting the transmission 12, the cutter block 15, and the driving device 17 thereon.

The transmission 12 is configured for supporting the spindle 13 and rotating the spindle 13 at different speeds.

Figure 3:
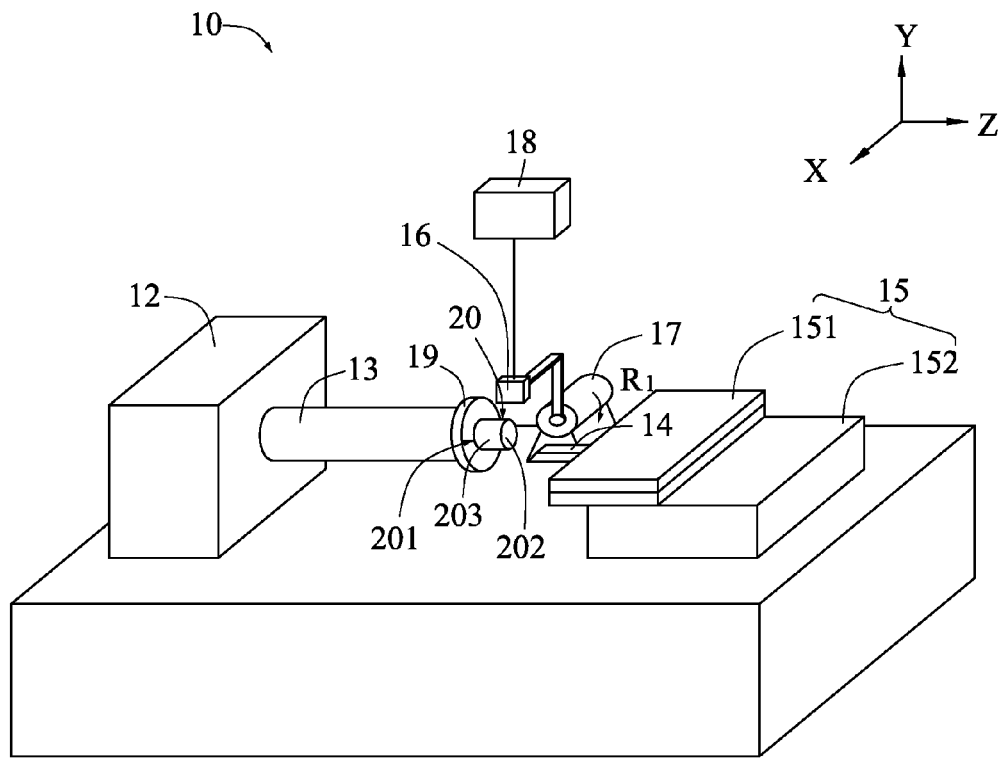
FIG. 3 is a schematic view of the machine tool of FIG. 1 during toolsetting, showing a workpiece fixed to the machine tool.

Referring also to FIG. 3, the spindle 13 is configured for rotating a workpiece 20. The workpiece 20 is mounted on the spindle 13 by a fixture 19. The fixture 19 may be a chuck, for example, a three-claw chuck or a four-claw chuck.

The cutter 14 is mounted on the cutter block 15 opposite to the spindle 13. The cutter 14 is configured for processing the workpiece 20. The cutter 14 may for example be a turning tool, a drilling cutter, a boring tool, or a milling tool.

The cutter block 15 is opposite to the transmission 12. The cutter block 15 includes a movable portion 151 and a fixed portion 152. The fixed portion 152 is fixedly mounted on the main body 11. The movable portion 151 is movably mounted on the fixed portion 152. The movable portion 151 is configured for supporting the cutter 14 mounted thereon. In other embodiments, there may be a plurality of cutters mounted on the movable portion 151.

The camera 16 is mounted on the driving device 17, and is configured for capturing images of the workpiece 20. The camera 16 may be a Charge Coupled Device (CCD) camera, a Complementary Metal-Oxide Semiconductor (CMOS) camera, or another suitable camera. In the illustrated embodiment, the camera 16 is connected to a display unit 18. The display unit 18 is configured for displaying the images received from the camera 16.

The driving device 17 is a rotary driving device having a rotational axis, and is configured for rotating the camera 16 about the rotational axis. Thus, the camera 16 rotationally captures images of the workpiece 20. The driving device 17 may be an air driving device, for example, a rotary cylinder. The driving device 17 also may be a hydraulic driving device, an electro-hydraulic servo driving device, a magnetic driving device, or another suitable driving device.

Figure 2:
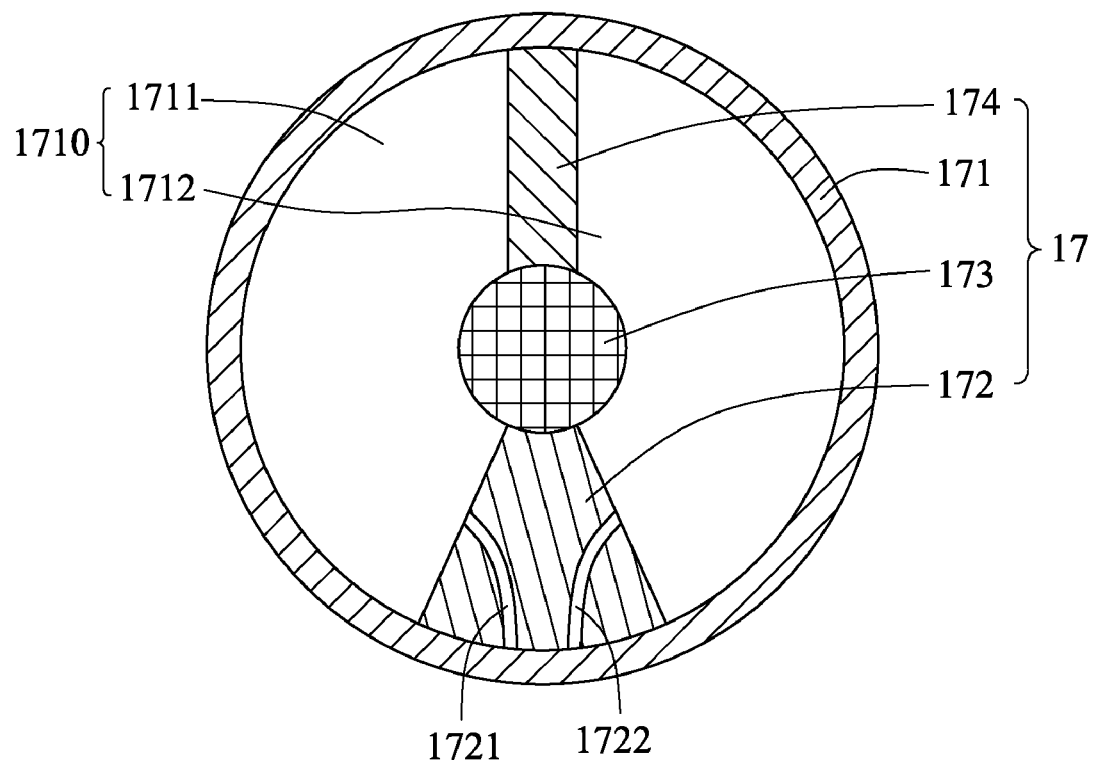
FIG. 2 is an enlarged, sectional view of the driving device of FIG. 1.

Referring also to FIG. 2, in this embodiment, the driving device 17 is a rotary cylinder. The driving device 17 includes a cylinder block 171, a stator 172, a rotor 173, and a blade 174. The cylinder block 171 is mounted on the main body 11 through a base 170. The cylinder block 171 has a chamber 1710 defined therein. The stator 172, the rotor 173 and the blade 174 are received inside the chamber 1710, thus the chamber 1710 is divided into a first chamber section 1711 and a second chamber section 1712. The rotor 173 is disposed in the center of the chamber 1710. An axis of the rotor 173 is the rotational axis of the driving device 17, and is parallel to an axis X. The axis X is perpendicular to an axis Y and an axis Z. An axis of the spindle 13 is parallel to the axis Z. The main body 11 is perpendicular to the axis Y.

The stator 172 is disposed between the cylinder block 171 and the rotor 173. The stator 172 has a first airflow passage 1721 and a second airflow passage 1722. The first airflow passage 1721 provides airflow communication with the first chamber section 1711. The second airflow passage 1722 provides airflow communication with the second chamber section 1712. The blade 174 is disposed between the cylinder block 171 and the rotor 173. The blade 174 is mounted on the rotor 173. Rotation of the blade 174 changes the size differential between the first chamber section 1711 and the second chamber section 1712. The rotor 173 is connected to the camera 16 through a first connection member 175 and a second connection member 176. The first connection member 175 is between the rotor 173 and the second connection member 176. The first connection member 175 is movable in the Y-Z plane. The second connection member 176 is between the first connection member 175 and the camera 16. The second connection member 176 is parallel to the axis X and perpendicular to the first connection member 175. When compressed air passes through the first airflow passage 1721 into the first chamber section 1711, the compressed air drives the blade 174 to rotate, and the rotor 173, the first connection member 175, the second connection member 176 and the camera 16 are rotated in unison. The camera 16 thus rotates about the rotational axis along a direction R1. When compressed air passes through the second airflow passage 1722 into the second chamber section 1712, the compressed air drives the blade 174 to rotate, and the rotor 173, the first connection member 175, the second connection member 176 and the camera 16 are rotated in unison. The camera 16 thus rotates about the rotational axis along a direction R2. That is, by adjusting the amount and rate of compressed air flowing into the first chamber section 1711 or the second chamber section 1712, the camera 16 can be driven to rotate about the rotational axis in the direction R1 or R2 to a desired position. The driving device 17 further includes an air element (not shown) and a controller (not shown). The air element is configured for providing compressed air. The controller is configured for controlling the amount and rate of compressed air flowing into the first chamber section 1711 or the second chamber section 1712.

In the illustrated embodiment, the machine tool 10 is a horizontal lathe, and may for example be a computer numerical control (CNC) lathe. In other embodiments, the machine tool 10 may for example be a vertical lathe or a turret lathe, or another kind of machine such as a boring machine, planer, shaper, milling machine, cylindrical grinder, drill press, saw, circular saw, broaching machine, and so on. That is, various other kinds of machine tools are equally within the scope of the present disclosure.

Referring to FIG. 3, the workpiece 20 illustrated is a cylindrical body of material. The workpiece 20 includes a first end surface 201, a second end surface 202, and an annular side surface 203. The annular side surface 203 connects the first end surface 201 and the second end surface 202. The first end surface 201 is nearest the spindle 13. The second end surface 202 is to be processed by the cutter 14.

The workpiece 20 is mounted on the spindle 13 by the fixture 19 in preparation for processing. The cutter 14 is movable in the X-Y plane, and is moved adjacent the workpiece 20 and roughly aligned with the workpiece 20. The camera 16 is rotated above the workpiece 20 and the cutter 14, and captures images of the cutter 14 relative to the workpiece 20. The relative position of the cutter 14 to the workpiece 20 is displayed by the display unit 18 and observed by an operator. The movable portion 151 is then appropriately adjusted if and as needed. The cutter 14 is thus aligned in position precisely, and toolsetting is complete. The workpiece 20 can then be accurately processed by the cutter 14.

Figure 4:
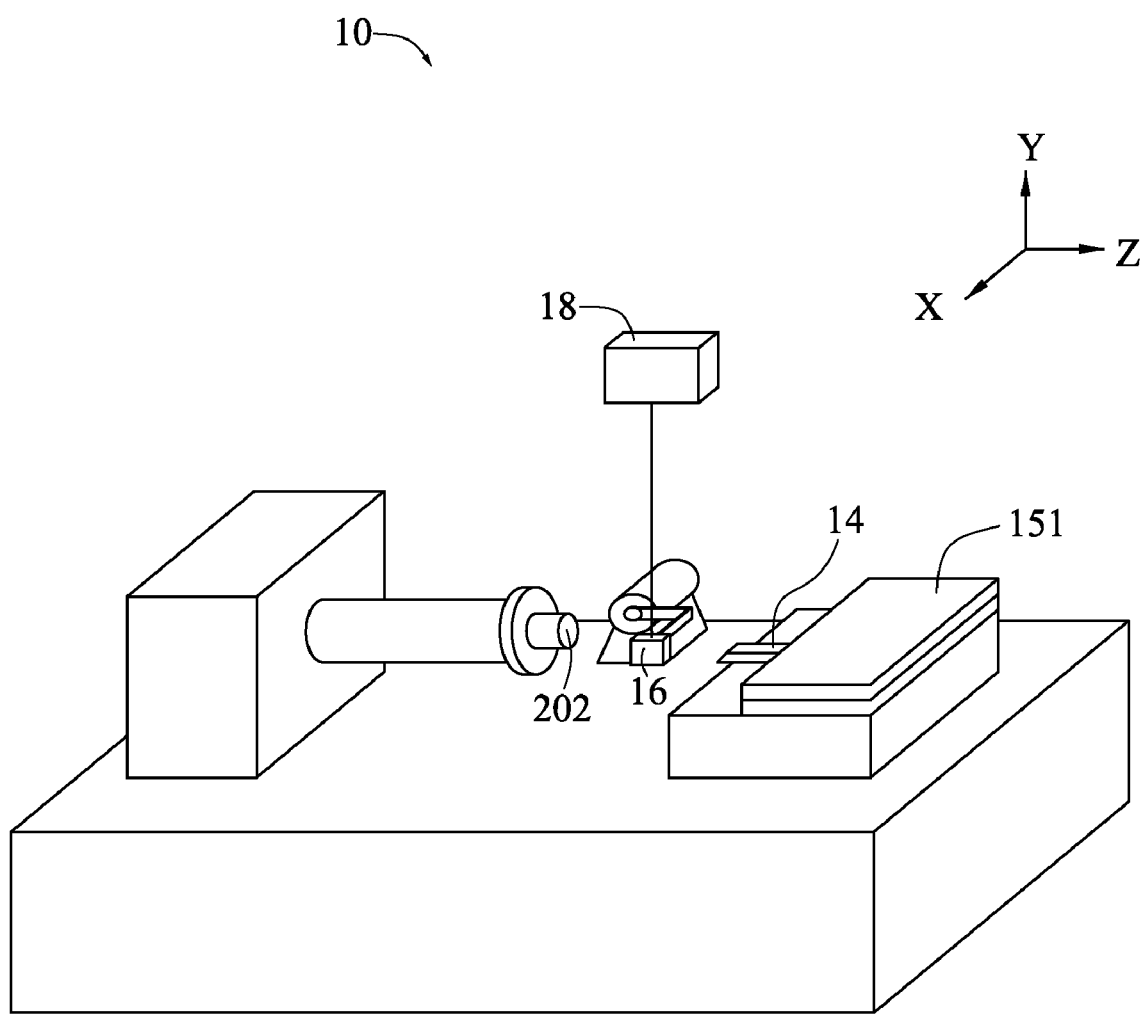
FIG. 4 is similar to FIG. 3, but showing the camera observing the workpiece from a different position.

When the workpiece 20 has been completely processed, the cutter 14 is moved away from the workpiece 20 along the direction of the axis Z. The camera 16 is then rotated about the rotational axis along the direction R1 until the camera 16 is opposite to the second end surface 202 of the workpiece 20 (as shown in FIG. 4). The camera 16 then captures images of the second end surface 202. The shape of the second end surface 202 is displayed by the display unit 18 and observed by the operator. The workpiece 20 need not be removed from the spindle 13.

Figure 5:
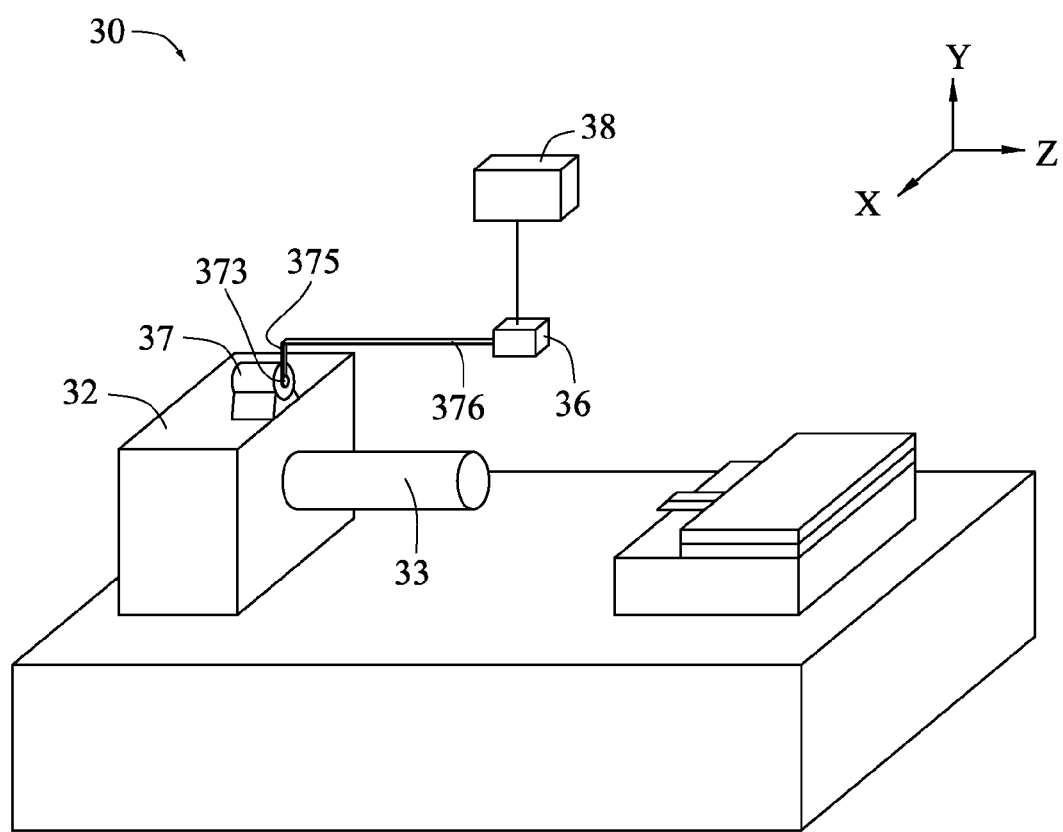
FIG. 5 is a schematic view of a machine tool according to a second embodiment, the machine tool including a driving device and a camera.

FIG. 5 is a schematic view of a machine tool 30 according to a second embodiment. The machine tool 30 differs from the machine tool 10 in that a driving device 37 is mounted on a transmission 32. A rotational axis of the driving device 37 is parallel to an axis of the spindle 33. In other words, an axis of a rotor 373 of the driving device 37 is parallel to an axis Z. A first connection member 375 of the driving device 37 moves in an X-Y plane. A second connection member 376 is parallel to the axis Z and perpendicular to the first connection member 375. A camera 36 is rotated about the rotational axis by the driving device 37.

Figure 6:
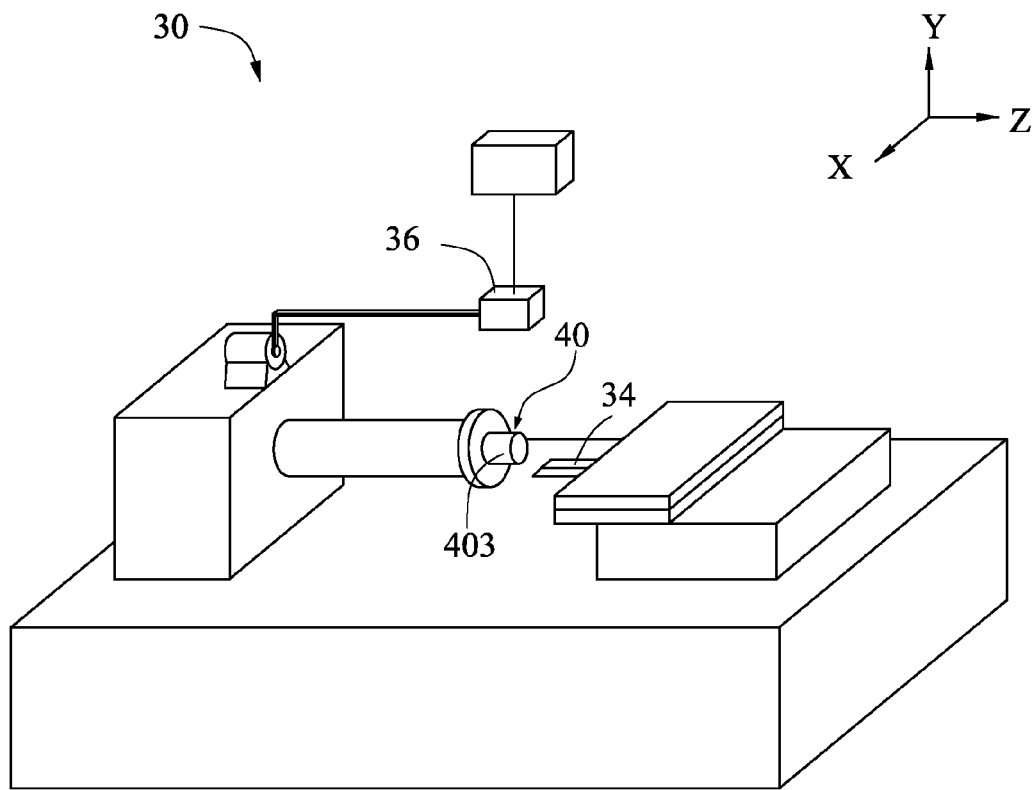
FIG. 6 is a schematic view of the machine tool of FIG. 5 during toolsetting, showing a workpiece fixed to the machine tool.

Referring also to FIG. 6, this shows the machine tool 30 and a workpiece 40 during toolsetting. The workpiece 40 differs from the workpiece 20 in that an annular side surface 403 of the workpiece 40 is to be processed. The camera 36 is rotated above the workpiece 40 and the cutter 34. The camera 36 then captures images of the cutter 34 relative to the workpiece 40.

Figure 7:
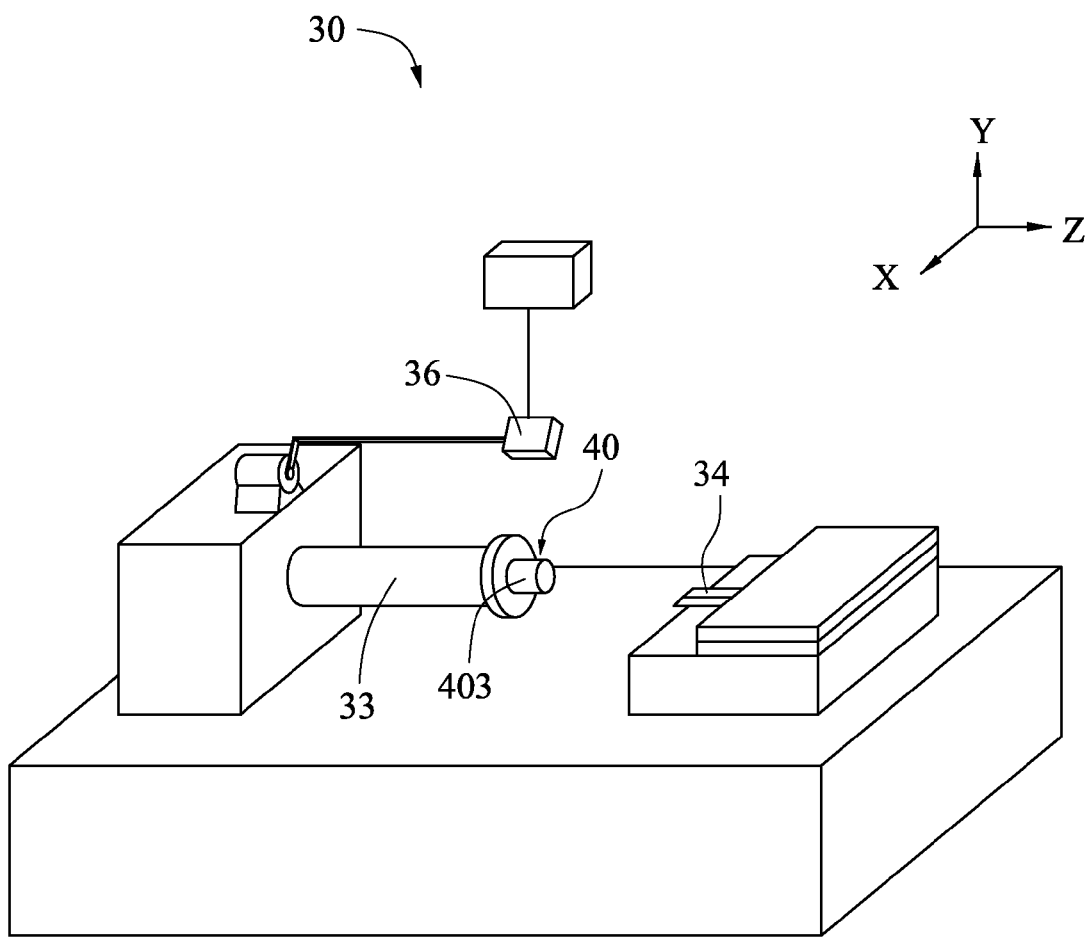
FIG. 7 is similar to FIG. 6, but showing the camera observing the workpiece.

Referring to FIG. 7, when the workpiece 40 has been completely processed, the cutter 34 is moved away from the workpiece 40 along the direction of the axis Z. The camera 36 is then rotated about the rotational axis, and captures images of the annular side surface 403. The shape of the annular side surface 403 is displayed by a display unit 38 and observed by an operator. The workpiece 40 need not be removed from the spindle 33.

While various embodiments have been described by way of example, it is to be understood that the invention is not limited thereto. To the contrary, various modifications and similar arrangements (as would be apparent to those skilled in the art) are intended to be covered. Therefore, the scope of the appended claims should be accorded the broadest interpretation so as to encompass all such modifications and similar arrangements.

What is claimed is:

1. A machine tool comprising:
   a main body;
   a transmission coupled to the main body;
   a spindle coupled to the transmission;
   a fixture coupled to the spindle, and capable of holding a workpiece;
   a cutter coupled to the main body, wherein the cutter is opposite to the spindle and capable of processing the workpiece;
   a driving device coupled to the main body, the driving device is one of a rotary cylinder, a hydraulic driving device, an electro-hydraulic servo driving device, and a magnetic driving device, and the driving device comprises a stator, a rotor, a blade, and a cylinder block, the stator, the rotor and the blade received in the cylinder block; and
   a camera coupled to the driving device, wherein the driving device is configured for moving the camera thereby enabling the camera to capture images of at least one of the cutter and the workpiece.

2. The machine tool of claim 1, wherein the driving device is coupled to the camera by a first connection member and a second connection member.

3. The machine tool of claim 2, wherein the second connection member is parallel to a rotational axis of the driving device, and the first connection member is perpendicular to the second connection member.

4. The machine tool of claim 1, wherein the rotational axis of the driving device is perpendicular to an axis of the spindle.

5. The machine tool of claim 1, further comprising a display unit, wherein the camera is connected to the display unit for displaying the images captured by the camera.

6. The machine tool of claim 1, wherein the camera is one of a Charge Coupled Device (CCD) camera and a Complementary Metal-Oxide Semiconductor (CMOS) camera.

7. The machine tool of claim 1, further comprising a cutter block comprising a movable portion and a fixed portion, the fixed portion fixed to the main body, and the movable portion movably coupled to the fixed portion.

8. The machine tool of claim 1, wherein the fixture comprises a chuck.

9. The machine tool of claim 1, wherein the cutter is one of a turning tool, a drilling cutter, a boring tool, and a milling tool.

10. A machine tool comprising:
a main body;
a transmission coupled to the main body;
a spindle coupled to the transmission;
a fixture coupled to the spindle, and capable of holding a workpiece;
a cutter coupled to the main body, wherein the cutter is opposite to the spindle and capable of processing the workpiece;
a driving device coupled to the transmission, the driving device is one of a rotary cylinder, a hydraulic driving device, an electro-hydraulic servo driving device, and a magnetic driving device, and the driving device further comprises a stator, a rotor, a blade, and a cylinder block, the stator, the rotor and the blade received in the cylinder block; and
a camera coupled to the driving device, wherein the driving device is configured for moving the camera thereby enabling the camera to capture images of at least one of the cutter and the workpiece.

11. The machine tool of claim 10, wherein the driving device is coupled to the camera by a first connection member and a second connection member.

12. The machine tool of claim 11, wherein the second connection member is parallel to a rotational axis of the driving device, and the first connection member is perpendicular to the second connection member.

13. The machine tool of claim 10, wherein the rotational axis of the driving device is parallel to an axis of the spindle.

14. The machine tool of claim 10, further comprising a display unit, wherein the camera is connected to the display unit for displaying the images captured by the camera.

15. The machine tool of claim 10, wherein the camera is one of a Charge Coupled Device (CCD) camera and a Complementary Metal-Oxide Semiconductor (CMOS) camera.

16. The machine tool of claim 10, further comprising a cutter block comprising a movable portion and a fixed portion, the fixed portion fixed to the main body, and the movable portion movably coupled to the fixed portion.

17. The machine tool of claim 10, wherein the fixture comprises a chuck.

18. The machine tool of claim 10, wherein the cutter is one of a turning tool, a drilling cutter, a boring tool, and a milling tool.

* * * * *